No. 816,712. PATENTED APR. 3, 1906.
H. W. CONWAY.
DAMPER FOR STOVEPIPES, FLUES, &c.
APPLICATION FILED JULY 17, 1905.

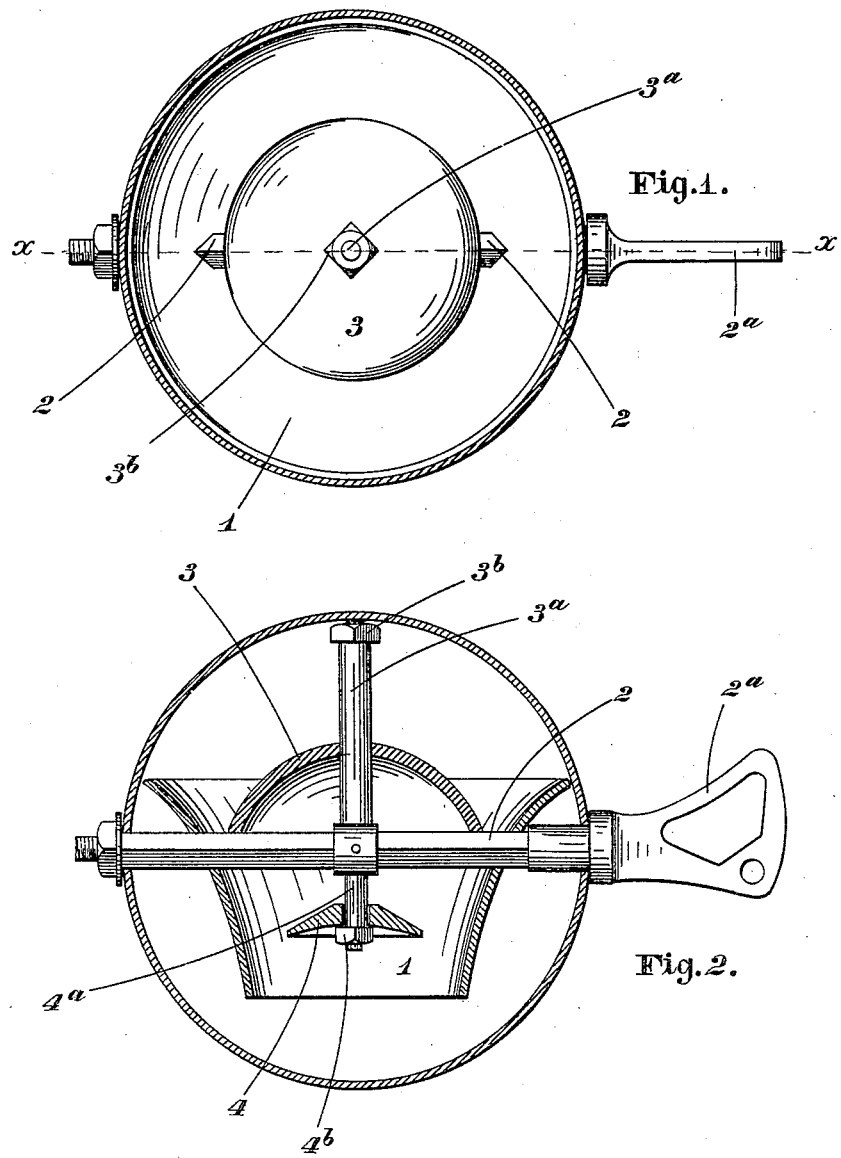

2 SHEETS—SHEET 2.

Witnesses
Benj. Finckel
Alice B. Cook.

Inventor
Harvey W. Conway
by Finckel & Finckel
his Attorneys

UNITED STATES PATENT OFFICE.

HARVEY W. CONWAY, OF COLUMBUS, OHIO.

DAMPER FOR STOVEPIPES, FLUES, &c.

No. 816,712.  Specification of Letters Patent.  Patented April 3, 1906.

Application filed July 17, 1905. Serial No. 270,026.

*To all whom it may concern:*

Be it known that I, HARVEY W. CONWAY, a citizen of the United States, residing at Columbus, in the county of Franklin and State of Ohio, have invented certain new and useful Improvements in Dampers for Stovepipes, Flues, &c.; and I do hereby declare the following to be a full, clear, and exact description of the invention, such as will enable others skilled in the art to which it appertains to make and use the same.

The object of this invention is to provide an improved damper for controlling the draft in stovepipes, flues, &c.

The invention consists in the construction hereinafter described and claimed.

Figure 3:
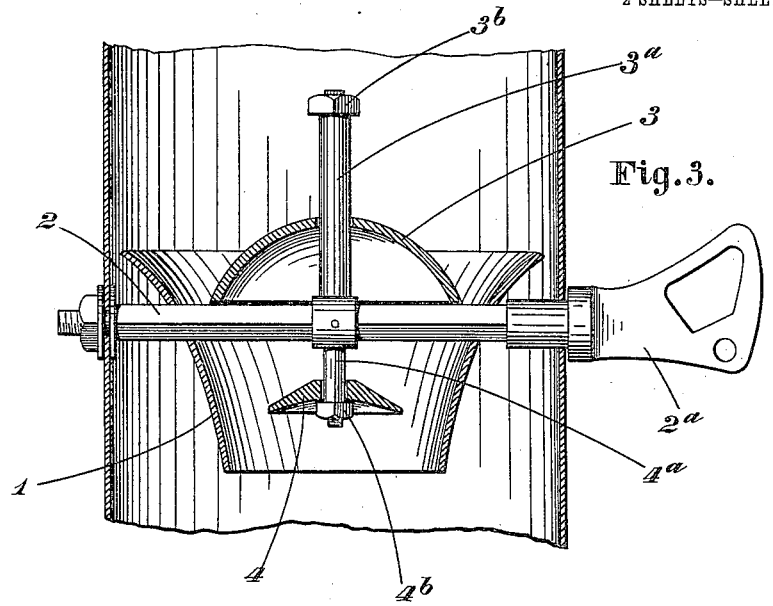
Figure 4:
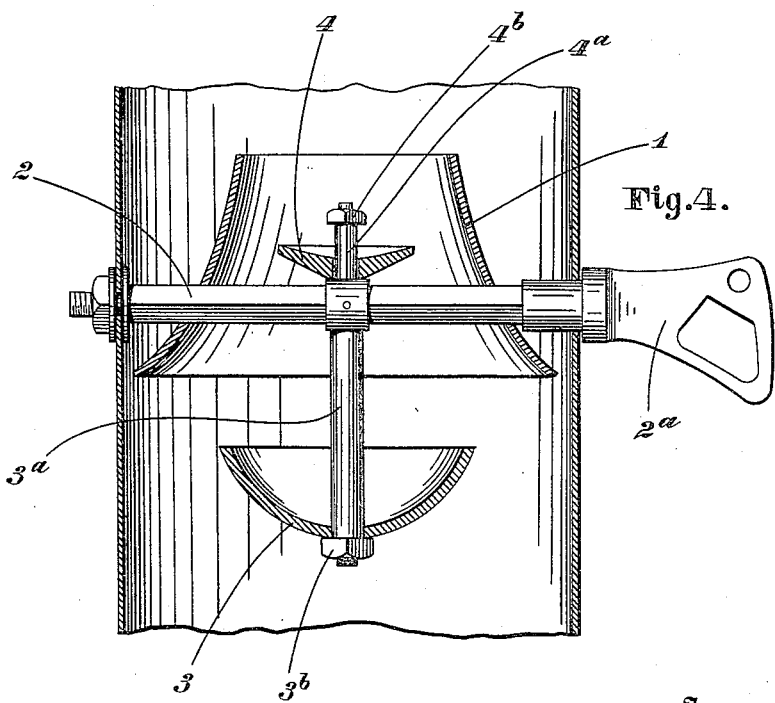

In the accompanying drawings, which illustrate but one embodiment of my invention, Figure 1 is a cross-section of a stovepipe with the damper in plan view, the damper being in that position where it effects the greatest closing of the pipe. Fig. 2 is a similar view with the damper turned ninety degrees from the position seen in Fig. 1, this being the position affording the freest passage for the products of combustion. Fig. 3 is a vertical sectional view on the line $x\ x$, Fig. 1, with the spindle and arm shown in elevation. Fig. 4 is a view similar to that of Fig. 3, except that the damper is inverted.

In the several views, 1 designates the bell, which is a hollow structure open at both ends and of truncated-cone form.

2 designates the spindle, which is square in its shank and is passed through square holes in the opposite walls of the bell, so that the latter can be revolved by rotating the spindle. The spindle is furnished with a finger-piece $2^a$ at its outer end, by means of which it can be rotated. Secured on the spindle in the axis of the bell and projecting in opposite directions therefrom is a long arm $3^a$ and a short arm $4^a$. Sliding on the arm $3^a$ is a cup 3, placed so that its open side faces the larger end of the bell, and sliding on the short arm $4^a$ is a smaller cup 4. On the extremities of the arms $3^a$ and $4^a$ are stop-nuts $3^b$ and $4^b$ to prevent the cups from falling off when the damper is turned over.

When the damper is turned to the position shown in Fig. 3, the cup 3 falls down against the spindle and the cup 4 against the nut $4^b$. When the damper is turned completely over from the last-described position, the parts take the position seen in Fig. 4—that is, the cup 3 drops down onto the nut $3^b$ and the cup 4 drops down to the spindle.

In the closing position, which, as before indicated, is shown in Fig. 3, the draft is checked. The intermediate or heat-holding position of the parts is shown in Fig. 4. Where great draft is desired, as in starting the fire, the damper is turned to the position seen in Fig. 2.

The finger-piece or handle will be made of such shape that its position will indicate that of the parts of the damper.

The spindle will be nutted in place, as usual, a spring-washer being interposed between the nut and pipe to afford the necessary friction to hold the damper in the position to which it is set.

I have found from practice with this damper that a large portion of the smoke and products of combustion are consumed, and therefore utilized as heat.

What I claim, and desire to secure by Letters Patent, is—

1. In a damper, the combination with a spindle, of the bell thereon, a rod on the spindle at right angles thereto and within the bell and a cup adapted to slide on said rod.

2. In a damper, the combination with a spindle, of the bell thereon, two rods on the spindle projecting at opposite sides therefrom and within the bell, and a cup on each of said rods and slidable thereon.

3. In a damper, the combination with a spindle, a tapering bell thereon open at both ends, and a device supported in the wider end of the bell and adapted to slide toward and from the smaller of the open ends to increase or diminish the area of the opening through the bell around the said device.

In testimony whereof I affix my signature in presence of two witnesses.

HARVEY W. CONWAY.

Witnesses:
C. B. SHOOK,
BENJ. FINCKEL.